United States Patent
Hodoshima et al.

(10) Patent No.: US 9,056,772 B2
(45) Date of Patent: Jun. 16, 2015

(54) METHOD FOR PRODUCING SYNTHESIS GAS

(75) Inventors: Shinya Hodoshima, Yokohama (JP); Fuyuki Yagi, Yokohama (JP); Shuhei Wakamatsu, Yokohama (JP); Kenichi Kawazuishi, Yokohama (JP)

(73) Assignees: JAPAN OIL GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL ENGINEERING CO., LTD., Tokyo (JP); CHIYODA CORPORATION, Yokohama-shi (JP)

( * ) Notice: Subject to any disclaimer, the term of this patent is extended or adjusted under 35 U.S.C. 154(b) by 313 days.

(21) Appl. No.: 13/581,026

(22) PCT Filed: Feb. 21, 2011

(86) PCT No.: PCT/JP2011/000934
§ 371 (c)(1),
(2), (4) Date: Aug. 24, 2012

(87) PCT Pub. No.: WO2011/108212
PCT Pub. Date: Sep. 9, 2011

(65) Prior Publication Data
US 2012/0316252 A1    Dec. 13, 2012

(30) Foreign Application Priority Data

Mar. 2, 2010 (JP) .................................. 2010-045697
Mar. 2, 2010 (JP) .................................. 2010-045699

(51) Int. Cl.
*C07C 27/00* (2006.01)
*B01D 47/00* (2006.01)
(Continued)

(52) U.S. Cl.
CPC . *C01B 3/384* (2013.01); *C01B 3/48* (2013.01); *C01B 2203/0233* (2013.01);
(Continued)

(58) Field of Classification Search
USPC ........ 518/700, 702; 423/210, 228, 230, 239.1
See application file for complete search history.

(56) References Cited

U.S. PATENT DOCUMENTS

| | | | |
|---|---|---|---|
| 2002/0006968 A1 | 1/2002 | Abbott | |
| 2002/0024038 A1 | 2/2002 | Iijima et al. | |
| 2008/0308769 A1 | 12/2008 | Marty et al. | |

FOREIGN PATENT DOCUMENTS

| | | |
|---|---|---|
| EP | 2 253 585 A1 | 11/2010 |
| JP | 7-197053 A | 8/1995 |

(Continued)

OTHER PUBLICATIONS

Notification of Transmittal Translation of the International Preliminary Report on Patentabililty (Forms PCT/IB/326 and PCT/IB/338) of International Application No. PCT/JP2011/000934 mailed Sep. 20, 2012 with Forms PCT/IB/373 and PCT/ISA/237.

(Continued)

*Primary Examiner* — Jafar Parsa
(74) *Attorney, Agent, or Firm* — Westerman, Hattori, Daniels & Adrian, LLP

(57) ABSTRACT

It is avoided that the sulfur compounds originating from the castable is mixed into produced synthesis gas, the mixed sulfur compounds are separated and collected with carbon dioxide, the collected carbon dioxide is recycled as raw material gas and then the sulfur compounds is directly supplied to the reformer to consequently degrade the reforming catalyst in the reformer by sulfur poisoning. The carbon dioxide separated and collected in the carbon dioxide removal step is introduced into the desulfurization apparatus of the desulfurization step or the sulfur compounds adsorption apparatus before being recycled to the reformer to remove the sulfur compounds.

12 Claims, 5 Drawing Sheets

(51) Int. Cl.
*C01B 17/16* (2006.01)
*C01B 3/38* (2006.01)
*C01B 3/48* (2006.01)
*C10G 2/00* (2006.01)

(52) U.S. Cl.
CPC .............. *C01B 2203/0238* (2013.01); *C01B 2203/0283* (2013.01); *C01B 2203/0415* (2013.01); *C01B 2203/0475* (2013.01); *C01B 2203/1241* (2013.01); *C01B 2203/127* (2013.01); *C01B 2203/148* (2013.01); C10G 2/32 (2013.01); *C01B 2203/062* (2013.01); *C10G 2300/1025* (2013.01); *C10G 2300/202* (2013.01); *C10G 2300/4081* (2013.01); *C10G 2400/06* (2013.01); *C10G 2400/08* (2013.01); *C01B 2203/1258* (2013.01)

(56) References Cited

FOREIGN PATENT DOCUMENTS

| | | |
|---|---|---|
| JP | 2000-169411 A | 6/2000 |
| JP | 2002-060203 A | 2/2002 |
| JP | 2007-258182 A | 10/2007 |
| JP | 2008-542188 A | 11/2008 |
| JP | 2009-221036 A | 10/2009 |

OTHER PUBLICATIONS

International Search Report of PCT/JP2011/000934, mailing date Mar. 29, 2011.
Japanese Written Opinion of PCT/JP2011/000934, mailing date Mar. 29, 2011.
Extended European Search Report dated Oct. 7, 2013, issued in corresponding European Patent Application No. 11750326.8 (8 pages).
Office Action dated Jul. 10, 2014, issued in corresponding Japanese Patent Application No. 2012-502990, with English Translation (8 pages).

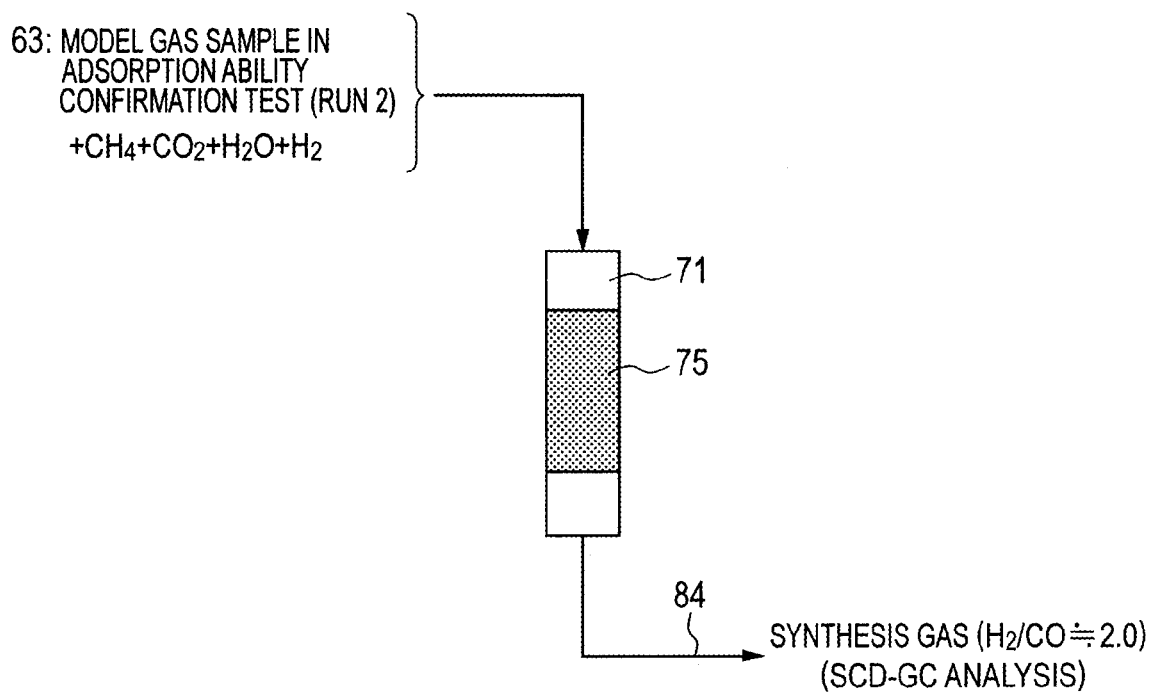

METHOD FOR PRODUCING SYNTHESIS GAS

TECHNICAL FIELD

This invention relates to a method for producing synthesis gas from natural gas. More specifically, the present invention relates to a method for removing sulfur compounds contained in a carbon dioxide collected from synthesis gas and recycled to raw material.

BACKGROUND ART

Natural gas is regarded as fuel that places less load to the environment compared with petroleum-based fuel because, when combusted, natural gas gives off neither sulfur oxide nor particulate substances that contaminate the atmosphere and produces less carbon dioxide per unit amount of generated heat. Further, natural gas can be distributed and used at room temperature, which provides an advantage of easy handling.

For this reason, natural gas is increasingly attracting attention as alternative fuel that can replace petroleum in the field of energy supply because solutions to the environment problem are urgently being looked for and diverse resources are required all over the world.

In the process of producing synthetic hydrocarbons such as naphtha, kerosene and gas oil by way of chemical reactions, using natural gas as raw material, generally synthesis gas (mixture gas of carbon monoxide and hydrogen) is produced as intermediate by a reforming reaction.

When producing synthesis gas, firstly the sulfur compounds contained in the natural gas to be used as raw material are removed in a desulfurization apparatus. Then, steam and/or carbon dioxide is added to the desulfurized natural gas and subsequently the desulfurized natural gas is introduced into a synthesis gas production apparatus and heated in a reformer. As a result, a reforming reaction proceeds in the reformer due to catalysis of the reforming catalyst filled in the reformer to thereby produce synthesis gas. While a steam reforming method using steam is mainly employed for the reforming reaction, a carbon dioxide reforming method using carbon dioxide has been put to practical use in recent years. A carbon dioxide reforming method does not require removal of the carbon dioxide contained in natural gas before a reforming reaction and hence provides an advantage of raising the efficiency of synthesis gas production process and reducing the synthesis gas production cost. Furthermore, the unreacted and/or produced carbon dioxide contained in the produced synthesis gas can be separated and collected for recycling to the synthesis gas production step so as to be reutilized in the carbon dioxide reforming reaction. Thus, carbon dioxide can be highly efficiently exploited as resource in a carbon dioxide reforming process.

Thereafter, typically, liquid hydrocarbons are produced from the produced synthesis gas by way of a Fischer-Tropsch reaction and synthetic hydrocarbons such as product fuel oil are produced by hydroprocessing the obtained liquid hydrocarbons in a hydrogenation process. The series of steps including a Fischer-Tropsch reaction is referred to as Gas-to-Liquids (GTL) process. Synthesis gas can also be used for methanol synthesis and oxo-synthesis.

Reforming reactions proceed at high temperatures typically between 700° C. and 900° C. in the case of steam reforming, for example. Therefore, the high-temperature synthesis gas that is discharged from the exit of a reformer is fed to a waste heat boiler by way of piping coated with refractory castable for a heat-exchange process.

SUMMARY OF INVENTION

Technical Problem

When the produced gas passes through the piping, the sulfur compounds originally contained in the castable can be released from the castable and mixed into the gas. Additionally, as carbon dioxide is separated and collected from the produced synthesis gas by chemical absorption using a weakly basic aqueous solution such as an amine solution, the sulfur compounds contained in the produced gas are also separated and collected with carbon dioxide at the same time. Then, the separated and collected gas is supplied to a synthesis gas producing reformer in a state of containing the sulfur compounds released from the castable to consequently give rise to a problem that the reforming catalyst used in the reformer is degraded by poisoning by the adsorbed sulfur compounds.

The object of the present invention is to avoid degradation of the reforming catalyst in the reformer by sulfur poisoning, which occurs in the way that: the sulfur compounds originating from the castable is mixed into the gas produced by a reforming reaction; the mixed sulfur compounds are separated and collected with carbon dioxide; and the sulfur compounds are supplied into the reformer when the collected carbon dioxide is recycled for the raw material.

Solution to Problem

In view of the above-mentioned problem, the present invention is characterized in that the gas containing the carbon dioxide that is separated and collected is introduced into a desulfurization apparatus in a desulfurization step or a sulfur compounds adsorption apparatus to remove sulfur compounds before the gas is supplied to a reformer.

Advantageous Effects of Invention

A means according to the present invention can remove the sulfur compounds, originating from the castable and contained in the carbon dioxide which is separated and collected from the synthesis gas for recycling, before they get into the reformer and prevent the reforming catalyst for producing synthesis gas from being degraded.

BRIEF DESCRIPTION OF DRAWINGS

FIG. 8 is a summarized schematic illustration of the reforming reaction test of Comparative Example.

DESCRIPTION OF EMBODIMENTS

Figure 1:
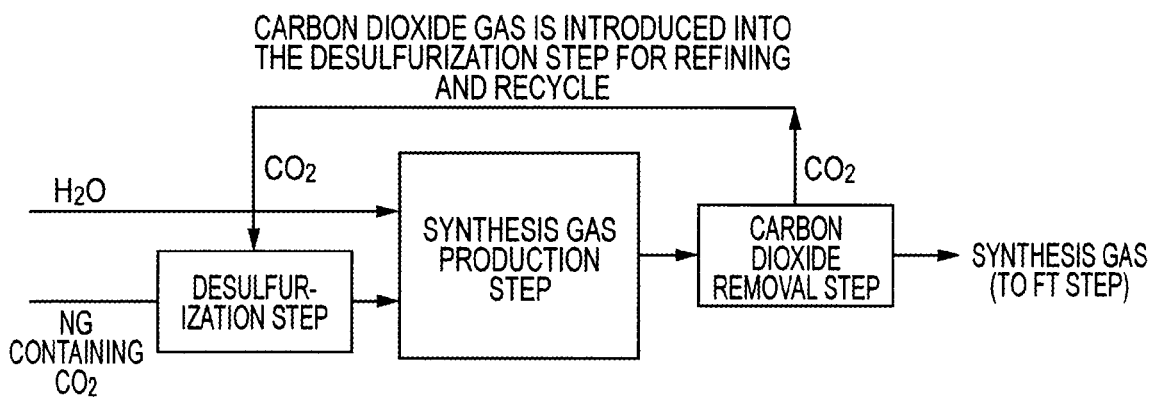
FIG. 1 is a schematic flowchart of a method for removing sulfur compounds according to the present invention.

A method for removing sulfur compounds originating from castable of the first embodiment of the present invention is described below by referring to FIG. 1. FIG. 1 is a schematic flowchart of a method for removing sulfur compounds originating from castable according to the first embodiment of the present invention.

The natural gas that is supplied to a GTL process or the like is firstly desulfurized by a desulfurization apparatus in a desulfurization step. While a known method selected from an alkali washing method, a solvent desulfurization method, a catalytic desulfurization method and other methods can be used for desulfurization, the use of a catalytic desulfurization method (hydrodesulfurization method) using a hydrogenation process for desulfurization is particularly preferable. A hydrodesulfurization method is a desulfurization method including a first step of subjecting the sulfur compounds contained in gas to a hydrogenation process and a second step of adsorbing the sulfur compounds hydrogenated in the first step by means of a desulfurizing agent.

The first step of the hydrodesulfurization method is a step of hydrogenating the organic sulfur compounds such as dimethyl sulfide (DMS: $(CH_3)_2S$) and carbonyl sulfide (COS) by means of a hydrogenation catalyst. While any catalyst whose activity is not hindered by sulfur compounds or any catalyst containing metal that promotes the activity of the catalyst by sulfur compounds may be used for the first step, the use of a Co—Mo based catalyst or an Ni—Mo based catalyst is preferable.

The second step of the hydrodesulfurization method is a step of adsorbing and removing the sulfur compounds that are hydrogenated in the first step by means of a desulfurizing agent. While any desulfurizing agent may be used for the second step, the use of a desulfurizing agent containing zinc oxide as main component is preferable. The expression of containing zinc oxide as main component means that the desulfurizing agent contains zinc oxide 90 wt % or any more.

Preferably, the concentration of the sulfur compounds contained in the desulfurized gas that is introduced into the synthesis gas production step is less than 10 vol-ppb in terms of sulfur atoms, in order to suppress the degradation of the reforming catalyst which will be described in detail hereinafter.

Steam and/or carbon dioxide is added to the desulfurized gas that is introduced into the synthesis gas production step so that shows a $H_2O/C$ mol ratio of larger than 0 and less than 3.0 and/or a $CO_2/C$ mol ratio of larger than 0 and less than 1.0.

A reforming reaction is conducted in the synthesis gas production step due to the catalysis of the reforming catalyst in the reformer by heating the mixture gas of the desulfurized natural gas and the gas separated and collected (to be referred to as "separated and collected gas" hereinafter) in the carbon dioxide removal step, which will be described in greater detail below, to produce synthesis gas to be used for a Fischer-Tropsch reaction or the like.

A reforming reaction can be made to take place by a known method such as a steam reforming method that uses steam or a carbon dioxide reforming method that uses carbon dioxide.

A steam reforming method is a method for producing synthesis gas according to reaction formula (1) shown below by adding steam to natural gas, whereas a carbon dioxide reforming method is a method for producing synthesis gas according to reaction formula (2) shown below by adding carbon dioxide to natural gas or by using the carbon dioxide contained in natural gas. Note that, each of the formulas listed below shows a reaction for reforming the methane contained in natural gas.

$$CH_4 + H_2O \rightarrow CO + 3H_2 \quad \text{formula (1):}$$

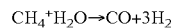

$$CH_4 + CO_2 \rightarrow 2CO + 2H_2 \quad \text{formula (2):}$$

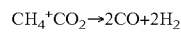

A steam reforming method and a carbon dioxide reforming method can be conducted at the same time to adjust the ratio of the CO and the $H_2$ that are produced by this embodiment. For example, it is possible to make the ratio close to $H_2/CO=2.0$, which is a preferable ratio for a Fischer-Tropsch reaction and for synthesizing methanol, or to $H_2/CO=1.0$, which is a preferable ratio for oxo synthesis. Then, the subsequent adjustment process can be eliminated, resulting in a great advantage of producing synthesis gas.

The carbon dioxide removal step of this embodiment is provided to separate and collect the carbon dioxide, produced by a shift reaction that accompanies the steam reforming in the synthesis gas production step and the carbon dioxide left unreacted in the carbon dioxide reforming, from the produced synthesis gas. While a chemical absorption method, a physical adsorption method and a membrane separation method are known as carbon dioxide separation/collection method, a chemical absorption method of employing an amine-based aqueous solution containing monoethanolamine or the like is preferably used for this embodiment.

Then, as chemical absorption method employing an amine-based aqueous solution, a method using an amine treater including an absorption tower and a regeneration tower may preferably be used. With this method, the carbon dioxide contained in synthesis gas is absorbed by an amine-based aqueous solution containing monoethanolamine or the like in the absorption tower, subsequently the carbon dioxide is released in the regeneration tower by heating the amine-based aqueous solution that has absorbed the carbon dioxide and subjecting it to a steam-stripping process and then the released carbon dioxide is collected.

When an amine-based aqueous solution is employed, carbon dioxide is absorbed as hydrogencarbonate ions according to reaction formula (3) shown below.

$$R-NH_2 + CO_2 + H_2O \rightarrow R-NH_3^+ + HCO_3^- \quad \text{formula (3):}$$

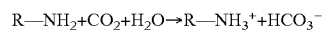

Since amine-based aqueous solutions such as monoethanolamine are weakly basic, an aqueous solution that has absorbed carbon dioxide as hydrogencarbonate ions releases the absorbed hydrogencarbonate ions as carbon dioxide when it is heated. In this way, the carbon dioxide contained in the produced synthesis gas can be separated and collected.

The carbon dioxide that is separated and collected in this way is subsequently introduced into the synthesis gas production step again and reutilized for a carbon dioxide reforming reaction.

Since the reforming reaction in the reformer of the synthesis gas production step proceeds at high temperatures, the produced synthesis gas is as hot as about 900° C. at the exit of the reformer. Therefore, the sulfur compounds in the castable that coats the piping that connects the exit of the reformer and the succeeding step (e.g., the waste heat boiler installed as heat exchanger) can be released from it in the form of hydrogen sulfide and mixed into the synthesis gas.

The hydrogen sulfide mixed into the synthesis gas is absorbed by the aqueous solution with the carbon dioxide according to reaction formula (4) shown below in the above-described carbon dioxide removal step and released just like the carbon dioxide when the aqueous solution is heated.

$$R-NH_2+H_2S \rightarrow R-NH_3^+ + HS^- \quad \text{formula (4):}$$

In other words, the separated and collected gas that is separated and collected in the carbon dioxide removal step and subsequently introduced into the synthesis gas production step contains the hydrogen sulfide released from the castable in addition to the carbon dioxide.

This embodiment is characterized in that the separated and collected gas that is separated and collected in the carbon dioxide removal step is introduced into the desulfurization unit in the desulfurization step instead of being directly supplied to the synthesis gas production step, in order to prevent hydrogen sulfide from being introduced into the synthesis gas production step. Since the sulfur compounds is contained in the separated and collected gas as hydrogen sulfide, when a hydrodesulfurization method is employed for the purpose of desulfurization, the separated and collected gas does not have to be passed through the first step of the hydrodesulfurization method. Thus, it is preferable that the separated and collected gas is introduced for desulfurization after the above-described first step and before the second step.

The separated and collected gas that is separated and collected in the carbon dioxide removal step and supplied to the desulfurization step shows a preferable temperature range from room temperature to 400° C., more preferably 300° C. to 400° C., a pressure level of 2.1 to 2.7 MPaG and a GHSV of 1,000 to 2,000 h$^{-1}$.

With the above-described arrangement, the hydrogen sulfide that is contained in the separated and collected gas collected in the carbon dioxide removal step is desulfurized in the desulfurization step. Then, as a result, it is possible to prevent the hydrogen sulfide contained in the separated and collected gas from being introduced into the synthesis gas production step and avoid degradation of the reforming catalyst in the synthesis gas production step by the sulfur compounds originating from the castable.

With this embodiment, the gas that is desulfurized by means of the above-described arrangement can suitably be used for a Gas-to-Liquids (GTL) process of producing synthetic hydrocarbon from natural gas by: producing synthesis gas in a synthesis gas production step by way of a reforming reaction; producing Fischer-Tropsch oil by subjecting the produced synthesis gas to a Fischer-Tropsch reaction and subsequently separating the gaseous product from the reaction product of the Fischer-Tropsch reaction; and distilling the hydrogenation product obtained by hydroprocessing the Fischer-Tropsch oil to separate light hydrocarbon gas and kerosene and gas oil that are the final product from each other.

Figure 5:
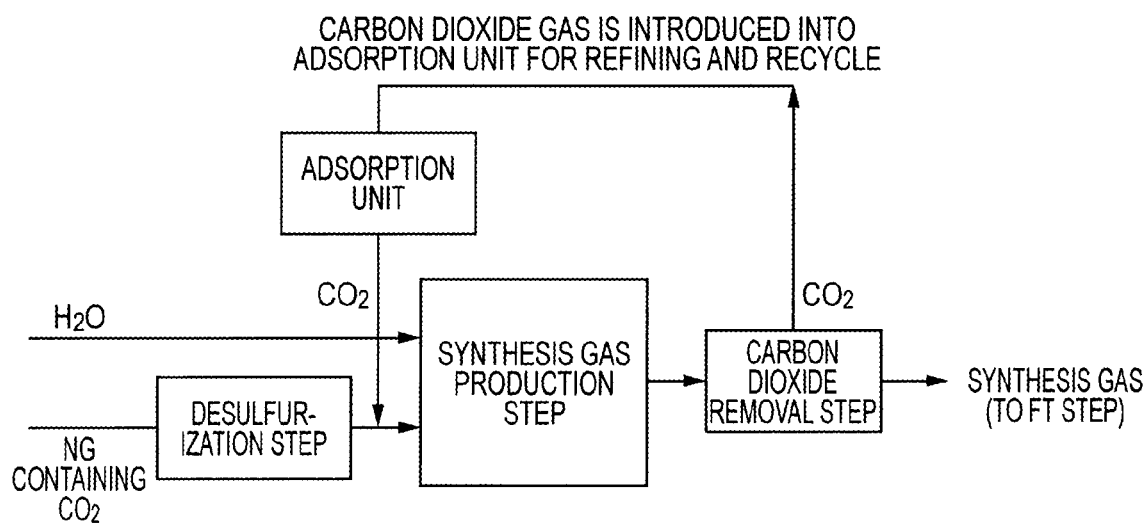
FIG. 5 is a schematic flowchart of another method for removing sulfur compounds according to the present invention.

Another method for removing sulfur compounds originating from castable according to the present invention is described below by referring to FIG. 5. FIG. 5 is a schematic flowchart of the method for removing sulfur compounds originating from castable, according to the second embodiment of the present invention. For the purpose of avoiding a duplicated description, only the differences between the first embodiment and the second embodiment will be described below.

The second embodiment of the present invention is characterized in that the separated and collected gas separated and collected in the carbon dioxide removal step is introduced into a sulfur compound adsorption apparatus and desulfurized there before being supplied to the synthesis gas production step, in order to prevent hydrogen sulfide from being introduced into the synthesis gas production step.

Preferably, an adsorbent such as active carbon or zeolite is employed in the adsorption apparatus. Granulated activated carbon, shaped carbon, filamentary activate carbonor the like are preferably employed as active carbon. Zeolite of the X-type is preferable. As for the profile of zeolite, a shaped zeolite of a cylindrical shape is preferable.

As for the operating conditions of the adsorption apparatus for adsorbing and desulfurizing the separated and collected gas separated and collected in the carbon dioxide removal step, the temperature range is preferable from room temperature to 50° C., more preferably from room temperature to 40° C., the pressure range is preferable 0.0 to 0.3 MPaG, more preferably 0.05 to 0.3 MPaG and the GHSV range is preferable 1,000 to 3,000 h$^{-1}$, more preferably 2,000 to 3,000 h$^{-1}$.

The temperature of the separated and collected gas separated and collected in the carbon dioxide removal step falls to the above range as the moisture contained in the gas is removed. Therefore, when active carbon or zeolite is employed as adsorbent showing a suitable adsorption activity at the above-described temperature range, neither a heat removing operation nor any other operations are required before adsorbing the sulfur compounds so that the sulfur compounds can be removed efficiently at low cost.

When the adsorbent is regenerated for use, it is preferably regenerated by steaming at a temperature more than 200° C. under atmospheric pressure.

With the above-described arrangement, the hydrogen sulfide contained in the separated and collected gas collected in the carbon dioxide removal step is adsorbed and desulfurized by the adsorption apparatus. Then, as a result, it is possible to prevent the hydrogen sulfide contained in the separated and collected gas from being introduced in the synthesis gas production step and avoid degradation of the reforming catalyst in the synthesis gas production step by the sulfur compounds originating from the castable.

With this embodiment, the mixture gas of the gas that is desulfurized by means of the above-described arrangement and source natural gas can suitably be used for a Gas-to-Liquids (GTL) process of producing synthetic hydrocarbon from natural gas by: producing synthesis gas in a synthesis gas production step by way of a reforming reaction; producing Fischer-Tropsch oil by subjecting the produced synthesis gas to a Fischer-Tropsch reaction and subsequently separating the gaseous product from the reaction product of the Fischer-Tropsch reaction; and distilling the hydrogenation product obtained by subjecting the Fischer-Tropsch oil to a hydrogenation process to separate light hydrocarbon gas and produced kerosene and gas oil that is the final product, from each other.

Now, the present invention will be described by way of examples in order for the present invention to be understood better. However, it is to be noted that the examples do not limit the scope of the present invention at all.

EXAMPLES

Example 1 and Example 2 described below were conducted in order to confirm that sulfur compounds are removed after the separated and collected gas containing carbon dioxide and hydrogen sulfide is recycled for source natural gas.

Example 1

Figure 2:
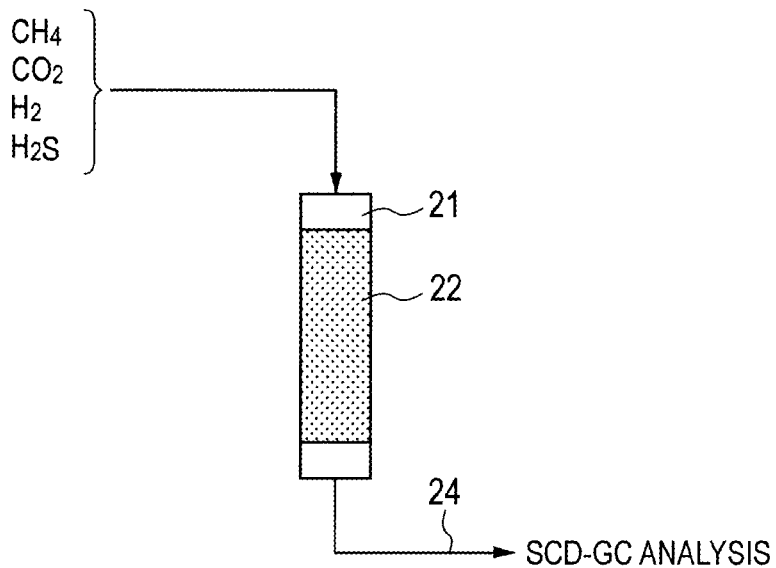
FIG. 2 is a summarized schematic illustration of the desulfurization performance confirming test of Example 1 and that of Example 2.

Desulfurizing agent 22 was filled in an SUS reaction tube 21 (FIG. 2) and model gas 23 containing carbon dioxide, methane, hydrogen and hydrogen sulfide was fed from the top of the apparatus to examine the desulfurizing effect of the desulfurizing agent (main component: ZnO). The carbon dioxide concentration was made to be 20%. Gas 24 was sampled at the exit of the reaction tube and the sulfur compound concentration in the desulfurized gas was measured by means of gas chromatography, using a sulfur chemiluminescence detector (SCD-GC). Table 1 shows the properties of the desulfurizing agent and Table 2 shows the test conditions and the obtained results.

TABLE 1

Properties of Desulfurizing Agent

| | |
|---|---|
| size: | 4.8 mmΦ × 15 mmL |
| shape: | Extrusions |
| bulk density: | 1,100 kg/m³ |
| rupture strength: | more than 44N |
| main component: | ZnO |

Example 2

A test the same as that of Example 1 except that the carbon dioxide concentration was altered so as to be 40% was conducted.

As shown in Table 2, the concentration of the hydrogen sulfide contained in the model gas showing a carbon dioxide concentration of 20% and that of the hydrogen sulfide contained in the model gas showing a carbon dioxide concentration of 40% were reduced respectively from about 10 ppm to 9 ppb and to 6 ppb at the exit. Thus, it was confirmed that the desulfurizing performance of the desulfurizing agent does not give rise to any problem for gas that contains carbon dioxide.

TABLE 2

Experimental Conditions and Summary of Results in Comfirming Test for Desulfurizing Performance

| | Example 1 | Example 2 |
|---|---|---|
| temperature of filled layer [° C.] | 320 | 320 |
| pressure [MPaG] | 2.1 | 2.1 |
| filled amount [cc] | 35 | 35 |
| GHSV [h⁻¹] | 1,600 | 1,600 |
| methane flow rate [NL/h] | 31.9 | 9.5 |
| flow rate of methane containing H2S [NL/h] | 11.2 | 22.4 |
| (H$_2$S concentration [vol-ppm]) | (48.0) | (24.5) |
| CO$_2$ flow rate [NL/h] | 11.2 | 22.4 |
| H$_2$ flow rate [NL/h] | 1.7 | 1.7 |
| total flow rate [NL/h] | 56.0 | 56.0 |
| methane concentration [mol %] | 77.0 | 57.0 |
| CO$_2$ concentration [mol %] | 20.0 | 40.0 |
| H$_2$ concentration [mol %] | 3.0 | 3.0 |
| H$_2$S concentration [vol-ppm] | 9.6 | 9.8 |
| Concentration of sulfur compound in produced gas in terms of sulfur atoms [vol-ppb] | 9.0 | 6.0 |

Example 3

A test was conducted in a manner as described below to confirm the effect of suppressing degradation of the reforming catalyst by the gas desulfurized in the desulfurization step in the first embodiment.

Figure 3:
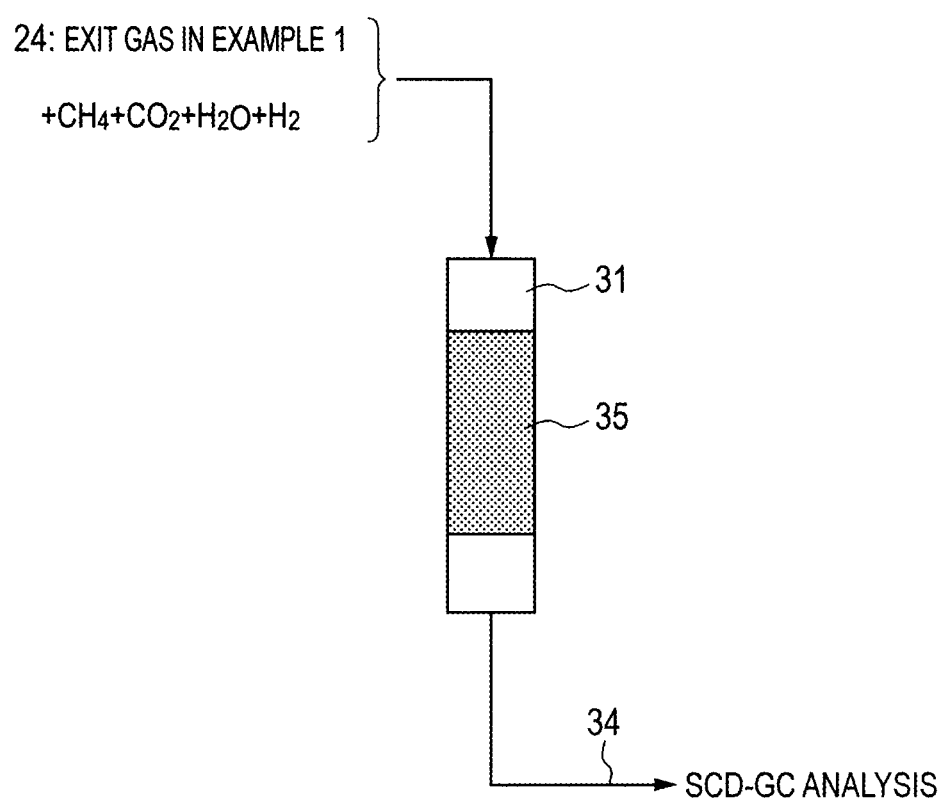
FIG. 3 is a summarized schematic illustration of the reforming reaction test of Example 3.

A reforming reaction test for producing synthesis gas with an H$_2$/CO ratio of 2.0 was conducted by using the desulfurized gas 24 coming out of the reactor exit of Example 1 as raw material and an SUS reaction tube 31 filled with reforming catalyst 35 (FIG. 3). Additionally, concentration of the sulfur compound in the synthesis gas 34 discharged from the reactor exit was measured by means of SCD-GC analysis. Table 3 shows the test conditions and also the test results obtained after 0 h (immediately after the start of the test) and after 300 h.

As seen from Table 3, during the reforming reaction of 300 hours, concentration of the sulfur compound in the produced synthesis gas was less than 5 ppb and the catalytic activity was stably maintained (with 100% achievement of equilibrium in methane conversion under the reactor exit conditions), while the amount of carbon deposit on the catalyst was less than 0.1 wt % after the reaction, to prove that an excellent catalytic performance was maintained. The expression of the degree of achievement of equilibrium refers to the percent value relative to the equilibrium value of methane conversion (theoretical limit), showing the extent to which methane conversion is achieved.

From the results of Example 1 to 3, it was proved that the reforming catalyst is not degraded and no problem arises to the reforming reaction when separated and collected gas is refined by means of the desulfurizing agent of the examples and recycled for the reforming reaction for producing synthesis gas.

TABLE 3

Reforming Reaction Test Conditions and Results

| | reaction time [h] | |
|---|---|---|
| | 0 | 300 |
| entrance temperature of catalyst layer [° C.] | 500 | 500 |
| exit temperature of catalyst layer [° C.] | 850 | 850 |
| pressure [MPaG] | 2.1 | 2.1 |
| catalyst amount [cc] | 81 | 81 |
| GHSV [h⁻¹] | 3,000 | 3,000 |
| methane flow rate [NL/h] | 88.2 | 88.2 |
| H$_2$O flow rate [NL/h] | 109.5 | 109.5 |
| CO$_2$ flow rate [NL/h] | 42.4 | 42.4 |
| H$_2$ flow rate [NL/h] | 3.0 | 3.0 |
| total flow rate [NL/h] | 243.1 | 243.1 |
| H$_2$O/C ratio [—] | 1.07 | 1.07 |
| CO$_2$/C ratio [—] | 0.41 | 0.41 |
| Concentration of sulfur compound in produced gas in terms of sulfur atoms [vol-ppb] | <5 | <5 |
| degree of achievement of equilibrium in methane conversion [%] | 100 | 100 |
| amount of carbon deposit on catalyst [wt %] | — | <0.1 |

Comparative Example 1

A test as described below was conducted to confirm that the reforming catalyst is degraded by recycling carbon dioxide that contains hydrogen sulfide for the synthesis gas production step of the prior art.

Figure 4:
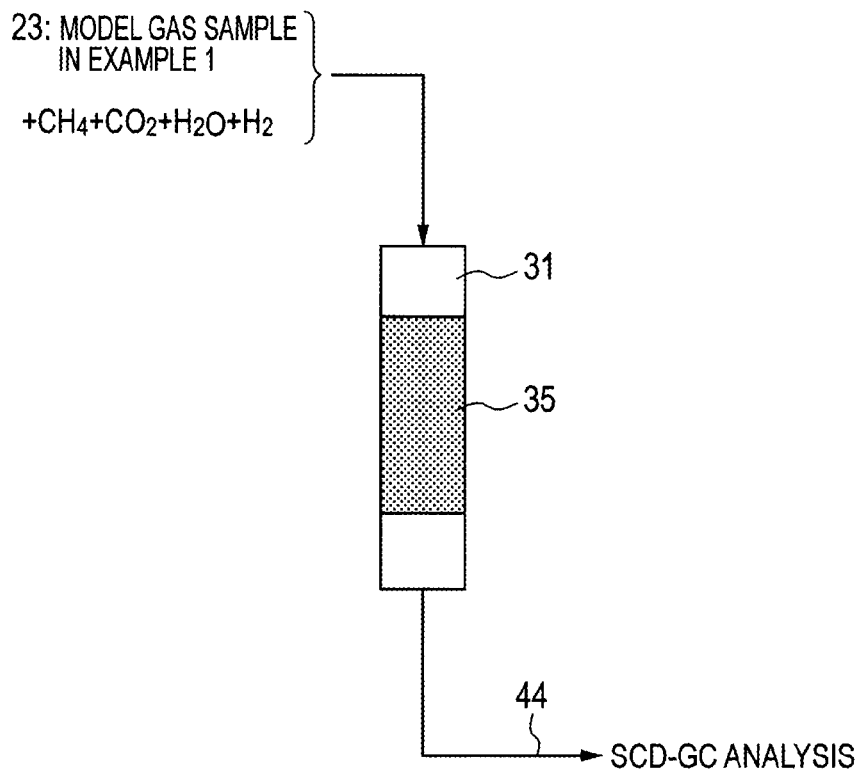
FIG. 4 is a summarized schematic illustration of the reforming reaction test of Comparative Example.

Model gas 23 containing hydrogen sulfide that was employed in Example 1 was also employed as raw material without passing it through a desulfurizing agent and a reforming reaction test for producing synthesis gas 44 showing an H$_2$/CO ratio of 2.0 was conducted under the conditions same as those of Example 3 (FIG. 4). Table 4 summarily shows the obtained results.

As seen from Table 4, the degree of achievement of equilibrium in methane conversion after 100 hours fell from 100% to 90% when the raw material gas containing hydrogen sulfide was used without being passed through the desulfurizing agent, to prove degradation of the catalytic activity. The amount of carbon deposit on the catalyst after the reaction, that indicated the damage to the catalyst, was about 1.0 wt %.

From the above, it was confirmed that the catalyst was degraded in a short period of time by sulfur poisoning.

From this comparative example, it was confirmed that the catalyst is degraded quickly if no desulfurizing agent is used.

TABLE 4

Reforming Reaction Test Conditions and Test Results

|  | reaction time [h] | |
|---|---|---|
|  | 0 | 100 |
| entrance temperature of catalyst layer [° C.] | 500 | 500 |
| exit temperature of catalyst layer [° C.] | 850 | 850 |
| pressure [MPaG] | 2.1 | 2.1 |
| catalyst amount [cc] | 81 | 81 |
| GHSV [h$^{-1}$] | 3,000 | 3,000 |
| methane flow rate [NL/h] | 88.2 | 88.2 |
| H$_2$O flow rate [NL/h] | 109.5 | 109.5 |
| CO$_2$ flow rate [NL/h] | 42.4 | 42.4 |
| H$_2$ flow rate [NL/h] | 3.0 | 3.0 |
| total flow rate [NL/h] | 243.1 | 243.1 |
| H$_2$O/C ratio [—] | 1.07 | 1.07 |
| CO$_2$/C ratio [—] | 0.41 | 0.41 |
| Concentration of sulfur compound in produced gas in terms of sulfur atoms [vol-ppm] | 2.2 | 1.7 |
| degree of achievement of equilibrium of methane conversion [%] | 100 | 90 |
| amount of carbon deposit on catalyst [wt %] | — | 1.0 |

Example 4

A test as described below was conducted to show that the sulfur compounds contained in separated and collected gas is desulfurized by the desulfurizing agent of the second embodiment.

Figure 6:
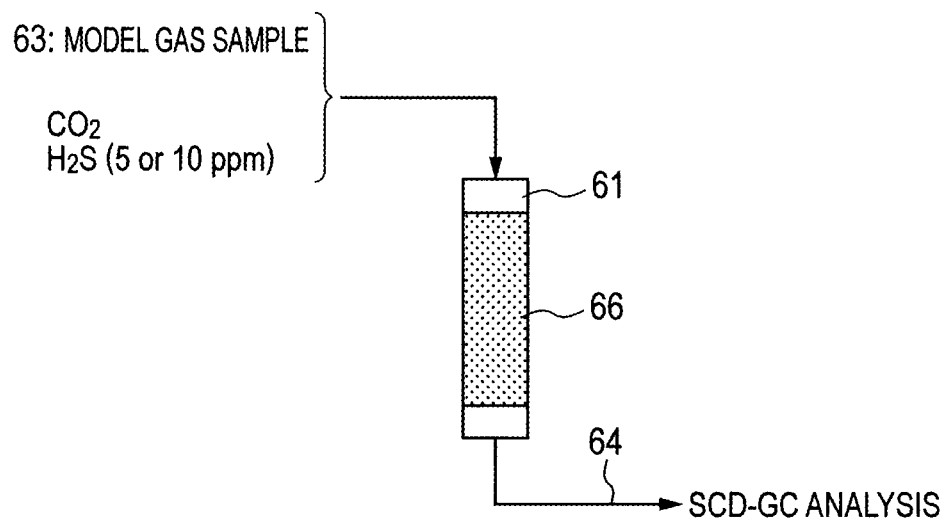
FIG. 6 is a summarized schematic illustration of the desulfurization performance confirming test of Example 4.

Each adsorbent 66 was filled in an SUS reaction tube (FIG. 6) and carbon dioxide 63 containing hydrogen sulfide (concentration: 5 vol-ppm or 10 vol-ppm) was fed from the top of the apparatus to examine the adsorbing performance of the adsorbent (Table 5 and Table 6). The tested adsorbents 66 included activated carbon SC8-7 available from Süd-Chemie Catalysts, Japan Inc. (granular, size: 1.70 to 4.70 mL) and X-type Zeolite TOSPIX94 available from Tokyo Gas Co., Ltd. (cylindrical, size: 1.5 mmΦ×5 mL), which were tested separately. After the adsorption process, the carbon dioxide 64 was sampled at the exit of the reaction tube and concentration of the sulfur compound in the carbon dioxide 64 was measured by means of gas chromatography, using a sulfur chemiluminescence detector (SCD-GC).

Concentration of the hydrogen sulfide in the carbon dioxide at the exit of the reaction tube was decreased to 7 vol-ppb when active carbon was used (Table 5) and to below 1 vol-ppb when zeolite was used (Table 6). Thus, it was confirmed that hydrogen sulfide of about 5 to 10 vol-ppm is adsorbed and removed by using either one of the adsorbents.

TABLE 5

Experimental conditions and summary of results in confirming test for desulfurizing performance of activated carbon

|  | Run No. | |
|---|---|---|
|  | 1 | 2 |
| temperature of filled layer [° C.] | 40 | 40 |
| pressure [MPaG] | 0.08 | 0.08 |
| filled amount [cc] | 15 | 15 |
| GHSV [h$^{-1}$] | 2,000 | 2,000 |

TABLE 5-continued

Experimental conditions and summary of results in confirming test for desulfurizing performance of activated carbon

|  | Run No. | |
|---|---|---|
|  | 1 | 2 |
| H$_2$S concentration in model gaseous sample [vol-ppm] | 5.0 | 10.0 |
| concentration of sulfur compound in produced gas in terms of sulfur atoms [vol-ppb] | 5.0 | 7.0 |

TABLE 6

Experimental conditions and summary of results in confirming test for desulfurizing performance of zeolite

|  | Run No. | |
|---|---|---|
|  | 3 | 4 |
| temperature of filled layer [° C.] | 40 | 40 |
| pressure [MPaG] | 0.08 | 0.08 |
| filled amount [cc] | 15 | 15 |
| GHSV [h$^{-1}$] | 3,000 | 3,000 |
| H$_2$S concentration in model gaseous sample [vol-ppm] | 5.0 | 10.0 |
| concentration of sulfur compound in produced gas in terms of sulfur atoms [vol-ppb] | <1.0 | <1.0 |

Example 5

A test as described below was conducted to show that separated and collected gas that is desulfurized by means of the adsorbent of the second embodiment can be used for a reforming reaction without degrading the reforming catalyst.

Figure 7:
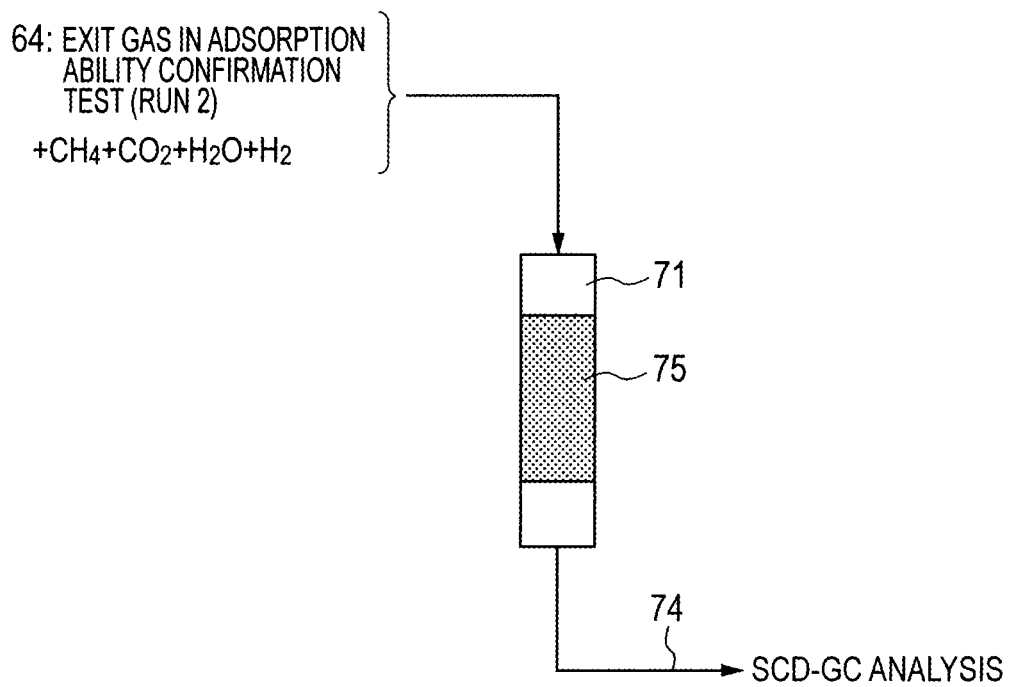
FIG. 7 is a summarized schematic illustration of the reforming reaction test of Example 5.

The carbon dioxide 64 subjected to an adsorption process using activated carbon in Example 4 (see Run 2, Table 5) was mixed with raw material gas for use and a reforming reaction test for producing synthesis gas 74 showing an H$_2$/CO ratio of 2.0 was conducted by means of an SUS reaction tube 71 filled with reforming catalyst 75 (FIG. 7). Concentration of the sulfur compound in the synthesis gas discharged from the reactor exit was also measured by means of SCD-GC analysis. As shown in Table 7, concentration of the sulfur compound in the produced synthesis gas was less than 5 ppb after 300 hours of the reforming reaction test. The degree of achievement of equilibrium in methane conversion under the reactor exit conditions was 100%, and hence a catalytic activity was stably maintained. Further, amount of carbon deposit on the catalyst was less than 0.1 wt % after the reaction, to prove that an excellent catalytic performance was maintained. From the above results of examination, it was proved that desulfurized carbon dioxide can suitably be recycled as raw material for producing synthesis gas when collected carbon dioxide is desulfurized by means of activated carbon or zeolite like the one used in this example.

TABLE 7

Reforming Reaction Test Conditions Using Source Gas Desulfurized by Activated Carbon and Summary of Test Results

|  | reaction time [h] | |
|---|---|---|
|  | 0 | 300 |
| entrance temperature of catalyst layer [° C.] | 500 | 500 |
| exit temperature of catalyst layer [° C.] | 850 | 850 |
| pressure [MPaG] | 2.1 | 2.1 |

TABLE 7-continued

Reforming Reaction Test Conditions Using Source Gas Desulfurized by Activated Carbon and Summary of Test Results

| | reaction time [h] | |
|---|---|---|
| | 0 | 300 |
| catalyst amount [cc] | 81 | 81 |
| GHSV [h$^{-1}$] | 3,000 | 3,000 |
| methane flow rate [NL/h] | 88.2 | 88.2 |
| H$_2$O flow rate [NL/h] | 109.5 | 109.5 |
| CO$_2$ flow rate [NL/h] | 42.4 | 42.4 |
| H$_2$ flow rate [NL/h] | 3.0 | 3.0 |
| total flow rate [NL/h] | 243.1 | 243.1 |
| H$_2$O/C ratio [—] | 1.07 | 1.07 |
| CO$_2$/C ratio [—] | 0.41 | 0.41 |
| concentration of sulfur compound in produced gas in terms of sulfur atoms [vol-ppb] | <5 | <5 |
| degree of achievement of equilibrium in methane conversion [%] | 100 | 100 |
| amount of carbon deposit on catalyst [wt %] | — | <0.1 |

Comparative Example 2

A test as described below was conducted to confirm that the reforming catalyst is degraded by using separated and collected gas of the second embodiment that was not desulfurized.

The carbon dioxide containing hydrogen sulfide that was used in Run 2 of Example 4 (concentration of contained hydrogen sulfide: 10 vol-ppm) was mixed with raw material gas without being passed through an absorbent and a reforming reaction test for producing synthesis gas 84 showing an H$_2$/CO ratio of 2.0 was conducted under the conditions same as those of Example 5 (FIG. 8).

Table 8 shows the test results. The catalyst activity fell (the degree of achievement of equilibrium in methane conversion fell from 100% to 90%) after 100 hours and amount of the carbon deposit on the catalyst after the reaction was about 1.0 wt % when carbon dioxide containing hydrogen sulfide and not subjected to an adsorption process was employed as raw material. From the above, it was confirmed that the catalyst was degraded in a short period of time by sulfur poisoning.

By this comparative example, it was confirmed that the catalyst is degraded quickly if collected carbon dioxide is recycled without being passed through an absorbent.

TABLE 8

Reforming Reaction Test Conditions Using Undesulfurized Source Gas Containing Hydrogen Sulfide and Summary of Test Results

| | reaction time [h] | |
|---|---|---|
| | 0 | 100 |
| entrance temperature of catalyst layer [° C.] | 500 | 500 |
| exit temperature of catalyst layer [° C.] | 850 | 850 |
| pressure [MPaG] | 2.1 | 2.1 |
| catalyst amount [cc] | 81 | 81 |
| GHSV [h$^{-1}$] | 3,000 | 3,000 |
| methane flow rate [NL/h] | 88.2 | 88.2 |
| H$_2$O flow rate [NL/h] | 109.5 | 109.5 |
| CO$_2$ flow rate [NL/h] | 42.4 | 42.4 |
| H$_2$ flow rate [NL/h] | 3.0 | 3.0 |
| total flow rate [NL/h] | 243.1 | 243.1 |
| H$_2$O/C ratio [—] | 1.07 | 1.07 |
| CO$_2$/C ratio [—] | 0.41 | 0.41 |
| Concentration of sulfur compound in produced gas in terms of sulfur atoms [vol-ppm] | 1.2 | 0.7 |
| degree of achievement of equilibrium in methane conversion [%] | 100 | 90 |
| amount of carbon deposit on catalyst [wt %] | — | 1.0 |

This application claims the benefit of Japanese Patent Application No. 2010-045697, filed Mar. 2, 2010 and Japanese Patent Application No. 2010-045699, filed Mar. 2, 2010, which are hereby incorporated by reference herein in their entirety.

REFERENCE SIGNS LIST

21 SUS reaction tube
22 desulfurizing agent
23 model gas
24 exit gas
31 SUS reaction tube
34 synthesis gas
35 reforming catalyst
44 synthesis gas
61 SUS reaction tube
63 model gas
64 exit gas
66 adsorbent
71 SUS reaction tube
74 synthesis gas
75 reforming catalyst
84 synthesis gas

The invention claimed is:

1. A method for producing synthesis gas comprising a desulfurization step of desulfurizing sulfur compounds in natural gas by means of a desulfurization apparatus; a synthesis gas production step for producing synthesis gas by way of a reforming reaction of gas containing desulfurized natural gas, steam and carbon dioxide; and a carbon dioxide removal step for separating and collecting separated and collected gas containing carbon dioxide as main component from the produced synthesis gas, the method further comprising a step of recycling the separated and collected gas for the synthesis gas production step,
wherein the desulfurization step is constituted of two steps including a first step of hydrogenating the sulfur compounds contained in natural gas and a second step of adsorbing the sulfur compounds hydrogenated in the first step by means of a desulfurizing agent, and
wherein said separated and collected gas is introduced into the natural gas after the first step and before the second step.

2. The method according to claim 1, characterized in that a main component of the desulfurizing agent employed in the desulfurization apparatus is zinc oxide.

3. The method according to claim 1, characterized in that a concentration of sulfur compounds contained in the gas introduced into the synthesis gas production step is less than 10 vol-ppb in terms of sulfur atoms.

4. The method according to claim 1, characterized in that said separated and collected gas shows a temperature range from 300 to 400° C., a pressure range from 2.1 to 2.7 MPaG and a GHSV range from 1,000 to 2,000 $h^{-1}$ at the time of being introduced into the desulfurization apparatus.

5. The method according to claim 1, characterized in that the gas introduced into the synthesis gas production step shows an $H_2O/C$ mol ratio of larger than 0 and less than 3.0 and a $CO_2/C$ mol ratio of larger than 0 and less than 1.0.

6. A method for producing synthetic hydrocarbons from natural gas, characterized in that synthesis gas produced by the method according to claim 1 is subjected to a Fischer-Tropsch reaction, Fischer-Tropsch oil is produced by separating a gaseous product from the Fischer-Tropsch reaction product, and light hydrocarbon gas and kerosene and gas oil that is the final product are separated from each other by distilling a hydrogenation product obtained by hydroprocessing the Fischer-Tropsch oil.

7. A method for producing synthesis gas comprising a desulfurization step for desulfurizing sulfur compounds in natural gas; a synthesis gas production step for producing synthesis gas by way of a reforming reaction of gas containing desulfurized natural gas, steam and carbon dioxide; and a carbon dioxide removal step for separating and collecting separated and collected gas containing carbon dioxide as main component from the produced synthesis gas, the method further comprising a step for recycling said separated and collected gas for the synthesis gas production step, wherein said separated and collected gas is introduced into an adsorption apparatus to remove sulfur compounds from said separated and collected gas and subsequently recycled for the synthesis gas production step, and wherein the adsorption apparatus is provided separately from the desulfurization step.

8. The method according to claim 7, characterized in that the adsorption apparatus employs active carbon or zeolite as adsorbent.

9. The method according to claim 7, characterized in that a concentration of the sulfur compounds contained in the gas recycled for the synthesis gas production step is less than 10 vol-ppb in terms of sulfur atoms.

10. The method according to claim 7, characterized in that an operating conditions of the adsorption apparatus is that a temperature range is room temperature to 50° C., a pressure range is 0.0 to 0.3 MPaG and a GHSV range is 1,000 to 3,000 $h^{-1}$.

11. The method according to claim 7, characterized in that the gas introduced into the synthesis gas production step shows an $H_2O/C$ mol ratio of larger than 0 and less than 3.0 and a $CO_2/C$ mol ratio of larger than 0 and less than 1.0.

12. A method for producing synthetic hydrocarbons from natural gas, characterized in that synthesis gas produced by the method according to claim 7 is subjected to a Fischer-Tropsch reaction, Fischer-Tropsch oil is produced by separating a gaseous product from the Fischer-Tropsch reaction product, and light hydrocarbon gas and kerosene and gas oil that is the final products are separated from each other by distilling a hydrogenation product obtained by hydroprocessing the Fischer-Tropsch oil.

* * * * *